(12) United States Patent
Dude

(10) Patent No.: US 9,599,267 B2
(45) Date of Patent: Mar. 21, 2017

(54) QUICK CONNECTION ARRANGEMENT FOR DETACHABLY CONNECTING A MEDIUM LINE TO A CONNECTING PIECE

(71) Applicant: ContiTech Schlauch GmbH, Hannover (DE)

(72) Inventor: Holger Dude, Voehl-Obernburg (DE)

(73) Assignee: ContiTech Schlauch GmbH, Hannover (DE)

( * ) Notice: Subject to any disclaimer, the term of this patent is extended or adjusted under 35 U.S.C. 154(b) by 9 days.

(21) Appl. No.: 14/611,047

(22) Filed: Jan. 30, 2015

(65) Prior Publication Data
US 2015/0145243 A1  May 28, 2015

Related U.S. Application Data

(63) Continuation of application No. PCT/EP2013/062320, filed on Jun. 14, 2013.

(30) Foreign Application Priority Data

Jul. 30, 2012 (DE) .................. 10 2012 106 925

(51) Int. Cl.
*F16L 37/098* (2006.01)
(52) U.S. Cl.
CPC ........ *F16L 37/0985* (2013.01); *F16L 37/0982* (2013.01); *F16L 2201/10* (2013.01)
(58) Field of Classification Search
CPC  F16L 37/0982; F16L 37/0985; F16L 2201/10
See application file for complete search history.

(56) References Cited

U.S. PATENT DOCUMENTS 5,069,424 A * 12/1991 Dennany, Jr. ....... F16L 37/0982
                                                         251/149.1
5,228,728 A *  7/1993 McNaughton ...... F16L 37/0982
                                                         285/319
(Continued)

FOREIGN PATENT DOCUMENTS

DE  20 2004 016 097 U1  2/2006
EP       1 873 439 A2   1/2008

OTHER PUBLICATIONS

International Search Report dated Aug. 6, 2013 of international application PCT/EP2013/062320 on which this application is based.
(Continued)

*Primary Examiner* — Daniel P Stodola
*Assistant Examiner* — Zachary Dragicevich
(74) *Attorney, Agent, or Firm* — Walter Ottesen, P.A.

(57) ABSTRACT

A quick connection arrangement is for detachably connecting a medium line to a (SAE) connecting piece. The quick connection arrangement includes a housing having an opening for receiving the medium line and a connecting piece opening for receiving the (SAE) connecting piece so as to permit a medium to flow through the housing between the medium line and the (SAE) connecting piece. An inner locking element for locking the (SAE) connecting piece in the connecting piece opening is arranged essentially inside the connecting piece opening. An outer locking element is for locking the inner locking element when the (SAE) connecting piece is locked. The inner locking element is arranged essentially outside of the connecting piece opening.

4 Claims, 15 Drawing Sheets

(56) References Cited

U.S. PATENT DOCUMENTS

| | | | | |
|---|---|---|---|---|
| 5,441,313 A | * | 8/1995 | Kalahasthy | F16L 37/0982 |
| | | | | 285/319 |
| 5,607,190 A | * | 3/1997 | Exandier | F16L 37/0985 |
| | | | | 285/308 |
| 5,607,193 A | | 3/1997 | Guest | |
| 6,767,034 B2 | | 7/2004 | Le Clinche | |
| 2005/0221679 A1 | * | 10/2005 | Takayanagi | F16L 37/0982 |
| | | | | 439/676 |
| 2007/0120362 A1 | * | 5/2007 | Poder | F16L 37/0985 |
| | | | | 285/314 |
| 2009/0035055 A1 | * | 2/2009 | Rosch | F16L 37/0982 |
| | | | | 403/314 |
| 2012/0080880 A1 | * | 4/2012 | Nakamura | F16L 37/0987 |
| | | | | 285/317 |
| 2012/0119485 A1 | * | 5/2012 | Cichorek | F16L 37/0985 |
| | | | | 285/81 |

OTHER PUBLICATIONS

Translation of the Written Opinion of the International Searching Authority dated Jan. 30, 2015 of international application PCT/EP2013/062320 on which this application is based.

* cited by examiner

QUICK CONNECTION ARRANGEMENT FOR DETACHABLY CONNECTING A MEDIUM LINE TO A CONNECTING PIECE

CROSS REFERENCE TO RELATED APPLICATIONS

This application is a continuation application of international patent application PCT/EP2013/062320, filed Jun. 14, 2013, designating the United States and claiming priority from German application 10 2012 106 925.5, filed Jul. 30, 2012, and the entire content of both applications is incorporated herein by reference.

FIELD OF THE INVENTION

The invention relates to a quick connection arrangement for detachably connecting a medium line to a (SAE) connecting piece.

BACKGROUND OF THE INVENTION

It has long been known to carry out the connection between medium conveying lines and supply points via quick connections or quick connect couplings, what are referred to as quick connectors (QCs) in order to save time on the installation. The quick connections are used, for example, for apparatus connections which are designed as connecting pieces according to SAE J 2044.

Quick connections of this type are popular in the automobile industry, for example in the low pressure range of fluid conveying lines, that is, at fluid pressures of up to approximately 10 bar, at diverse intersections, such as, for example, on the tank or in the case of pumps, filters, valves, et cetera.

A disadvantage of the known quick connections of this type is that, when the quick connections are inserted, it is not possible to discern whether the male part (SAE connecting piece) is correctly latched. If the latching of the quick connection does not take place correctly, the quick connection may become detached during operation, that is, the fluid conducting line becomes detached in an uncontrolled manner from the connecting piece and the fluid extensively escapes into, for example, the engine compartment of the vehicle. Particularly in the case of fuel lines, this may be highly hazardous to the user of the vehicle since, by this means, a vehicle fire may be caused by escaping fuel.

SUMMARY OF THE INVENTION

It is an object of the present invention to provide a quick connection arrangement of the type described above, in which a rapid and simple connection of medium line and connecting piece is made possible and at the same time it can be simply and reliably discerned visually or by feel that the quick connection is latched correctly and securely.

The quick connection arrangement of the invention is for detachably connecting a medium line to a connecting piece. The quick connection arrangement includes: a housing defining a first opening configured to receive the medium line therein; the housing defining a second opening for receiving the connecting piece so as to permit a medium to flow through the housing between the medium line and the connecting piece; the connecting piece and the medium line conjointly defining a longitudinal axis (A); an inner locking element arranged in the second opening and configured to lock the connecting piece in the second opening; an outer locking element arranged outside the second opening and configured to lock the inner locking element when locking the connecting piece; the outer locking element defining an immovable state wherein the outer locking element is immovable in a direction along the longitudinal axis (A) and a movable state; the inner locking element including a release mechanism configured to transfer the outer locking element from the immovable state into the movable state when the connection piece is inserted into the second opening; the housing having a cutout formed therein; the outer locking element having a blocking mechanism; and, the release mechanism being further configured to release the blocking mechanism via the cutout when the connecting piece is inserted into the second opening.

The present invention is based on the finding that the successful latching or locking between connecting piece and medium line can be indicated visually or visually and by feel by the fact that the complete locking of the quick connection arrangement is brought about by the outer locking element and the locking state discernibly differs from the non locking or unsatisfactory locking state of the quick connection arrangement.

This finding is used according to the invention by the fact that an inner locking element first of all locks the connecting piece in the connecting piece opening of the housing of the quick connection arrangement and the locking element is then, for its part, locked from the outside by an outer locking element. The second locking step here is discernible from the outside simply and safely visually and optionally also in addition by feel, and therefore a secure and rapid connection is provided, the successful, secure and reliable installation of which can be checked simply, rapidly and safely from the outside. At the same time, the two locking steps and therefore the quick connection can also be undone again simply, rapidly and without destruction. Both the connecting piece and the quick connection arrangement according to the invention can then be reused again in accordance with the invention.

The housing and the inner and outer locking element can contain a plastic or can consist thereof. A polyamide (PA), polyphthalamide (PPA) or polyphenylene sulfide (PPS) can preferably be used as the plastic. Particularly preferably, PA12, PA612, PA610, PPA or PPS is used as the material of the housing, PA11, PA612 or PA610 is used as the material of the inner locking element and PA12, PA612 or PA610 is used as the material of the outer locking element.

According to one aspect of the invention, the housing has at least one locking arm cutout from which a locking arm of the inner locking element can be pushed out radially. The outer locking element has at least one locking arm covering which, in a first position, can open up the locking arm cutout and, in a second position, can block the locking arm cutout.

It is advantageous in this connection that, a simple latching mechanism for latching a collar of the connecting piece can be provided via locking arms of the inner locking element, the locking arms being capable of being pushed radially out of the housing. At the same time, by preventing the locking arms from being pushed out through the outer blockade via the locking arm covering of the outer locking element, simple securing of the latched connecting piece can take place. The securing, furthermore, is discernible both visually and by feel in a simple and safe manner via the change in position, which is required for this purpose, of the outer locking element.

According to a further aspect of the invention, the outer locking element can be moved between the first position and the second position substantially in the direction of the longitudinal axis A of the quick connection arrangement.

It is advantageous here that a longitudinal movement can be carried out in the installation rapidly and simply. Furthermore, a change in the position of the outer locking element in the longitudinal direction can be discerned simply and safely both visually and by feel.

According to a further aspect of the invention, the outer locking element can be held both in the first position and in the second position in a manner positioned in relation to the housing.

It is advantageous in this connection that the two positions can thereby be taken up in a specified manner, for example by latching the outer locking element on the housing in the two positions. This also prevents the blockade of the locking arm cutout from being undone inadvertently, as a result of which the latching of the connecting piece via the inner locking element would also no longer be securely provided.

According to a further aspect of the invention, the inner locking element has at least one release mechanism which moves the outer locking element from a substantially immovable state in the direction of the longitudinal axis A into a movable state when the (SAE) connecting piece is introduced into the connecting piece opening.

It is advantageous in this connection that, via the introduction of the connecting piece into the connecting piece opening of the housing, the outer locking element is released displaceably in the direction of the longitudinal axis A because, after the connecting piece has been completely introduced and latched in the connecting piece opening, the state can be rapidly and simply secured by the outer locking element. This simplifies and accelerates the installation.

According to a further aspect of the invention, the housing has at least one cutout through which the release mechanism of the inner locking element can release a blockade mechanism of the outer locking element when the (SAE) connecting piece is introduced into the connecting piece opening.

It is advantageous in this connection that the outer locking element can be held securely in its (first) position by the blockade mechanism and the release for movement in the direction of the longitudinal axis A takes place automatically when the connecting piece is introduced. This simplifies and accelerates the installation.

According to a further aspect of the invention, the outer locking element has an opening ring with at least one push-in region such that the outer locking element, which is blocked in the second position, can be released from the blockade by a radially inwardly directed action of force in the push-in region.

It is advantageous in this connection that the outer locking element can be unlocked in this manner by the opening ring being pressed radially inward, for example manually, and, via this radial constriction in this region, the region of the opening ring in which, for example, the blockade mechanism and the latching arms of the outer locking element are located, is expanded radially in such a manner that the cams of the latching arms are thereby detached radially from the corresponding opening recesses or cutouts of the housing, as a result of which the blockade of the outer locking element can be detached in the (second) position in which the outer locking element secures the inner locking element.

The opening ring and also the corresponding region of the housing are preferably of oval design, and therefore the push-in region of the opening ring has a larger diameter than that region of the opening ring in which, for example, the blockade mechanism and the latching arms of the outer locking element are located. This assists the expansion of the opening ring in those regions in which, for example, the blockade mechanism and the latching arms of the outer locking element are located, when the push-in region is pushed in.

The oval opening ring preferably has its smallest diameter in those regions in which, for example, the blockade mechanism and the latching arms of the outer locking element are located. By this means, the expansion of the region is likewise assisted when the push-in region is pushed in.

According to a further aspect of the present invention, the housing has at least one radially outwardly pointing projection which can push against the outer locking element substantially from the inside radially in such a manner that a force which is directed substantially in the axial direction A toward the connecting piece opening can thereby be exerted on the outer locking element.

It is advantageous in this case that, in the non-installed state of the connecting piece, a prestress acting in the axial direction A can thereby be exerted on the outer locking element in the direction of the connecting piece opening of the housing, and therefore, when the connecting piece is introduced, the outer locking element automatically at least partially moves toward the connecting piece without an installation step being required for this.

With appropriate dimensioning of the prestress, the effect can ideally be achieved that, as soon as the outer locking element is released, in a first position, from the blockade by the introduced connecting piece, the outer locking element moves because of the prestress in the axial direction A toward the connecting piece to an extent such that the outer locking element is automatically blocked in a second position in which the inner locking element is also blocked by the outer locking element. By this means, the installation can be substantially simplified and accelerated.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
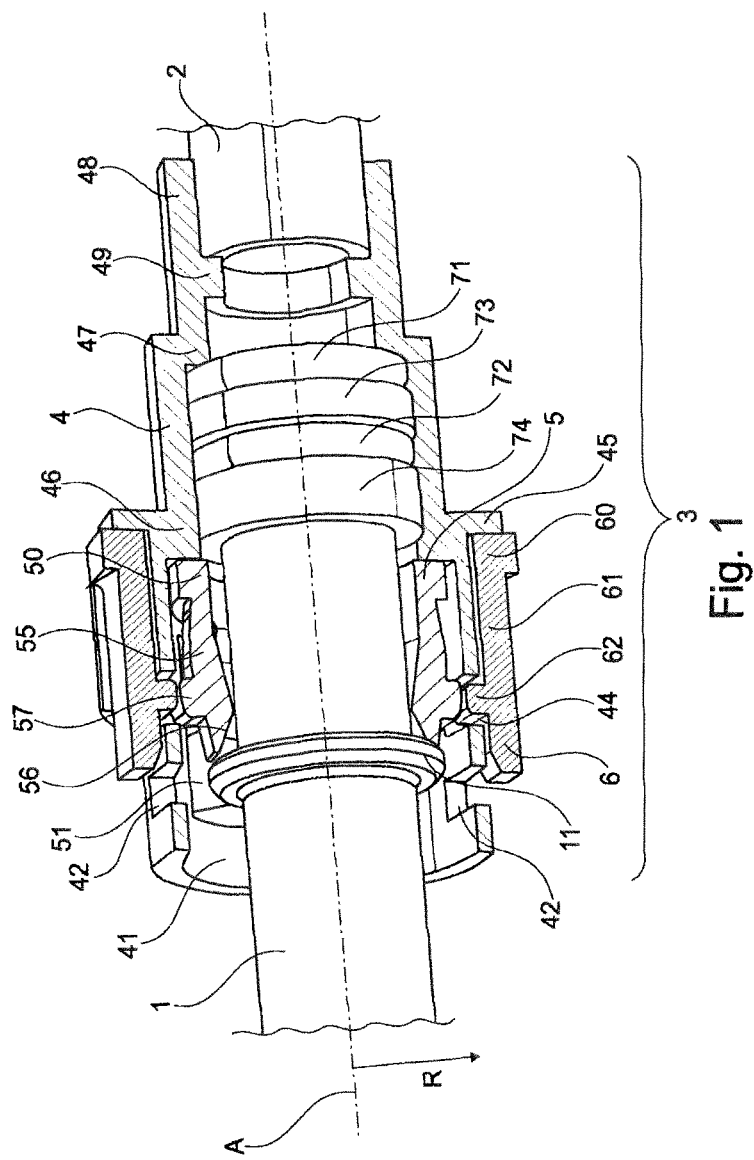
FIG. 1 shows a perspective schematic sectional illustration of a quick connection arrangement according to a first embodiment with a fluid line and a connecting piece which is partially introduced, but is not locked.
Figure 2:
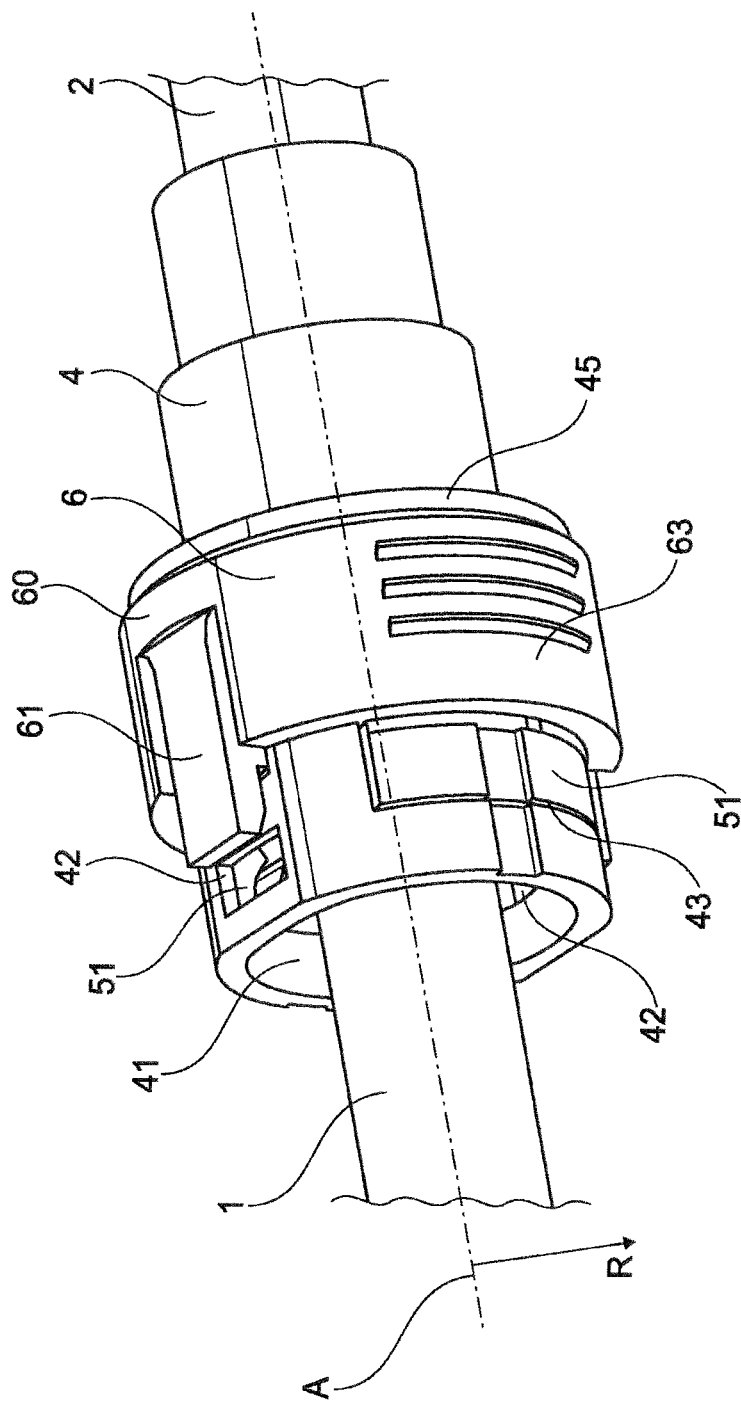
FIG. 2 shows a perspective schematic closed illustration of the quick connection arrangement according to the first embodiment of FIG. 1.

FIG. 1 shows a perspective schematic sectional illustration of a quick connection arrangement 3 according to a first embodiment with a fluid line 2 and a connecting piece 1 which is partially introduced, but is not locked. FIG. 2 shows a perspective schematic closed illustration of the quick connection arrangement 3 of FIG. 1.

Figure 3:
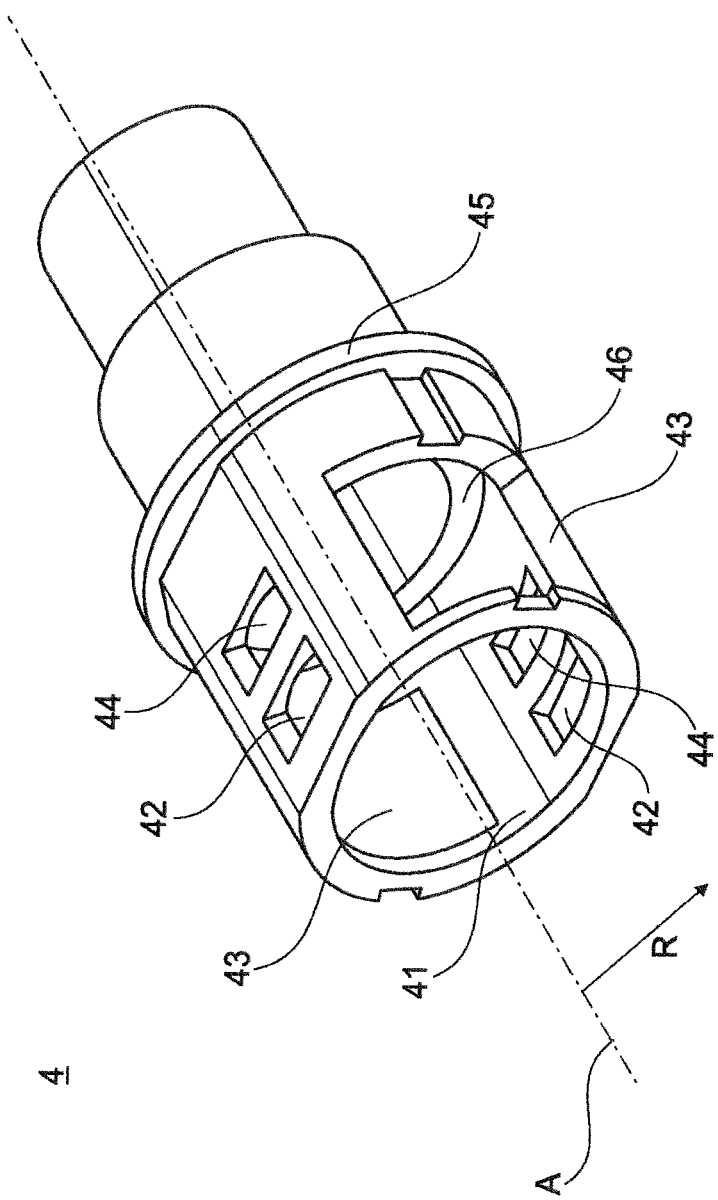
FIG. 3 shows a perspective schematic illustration of the housing of the quick connection arrangement according to the first embodiment.
Figure 4:
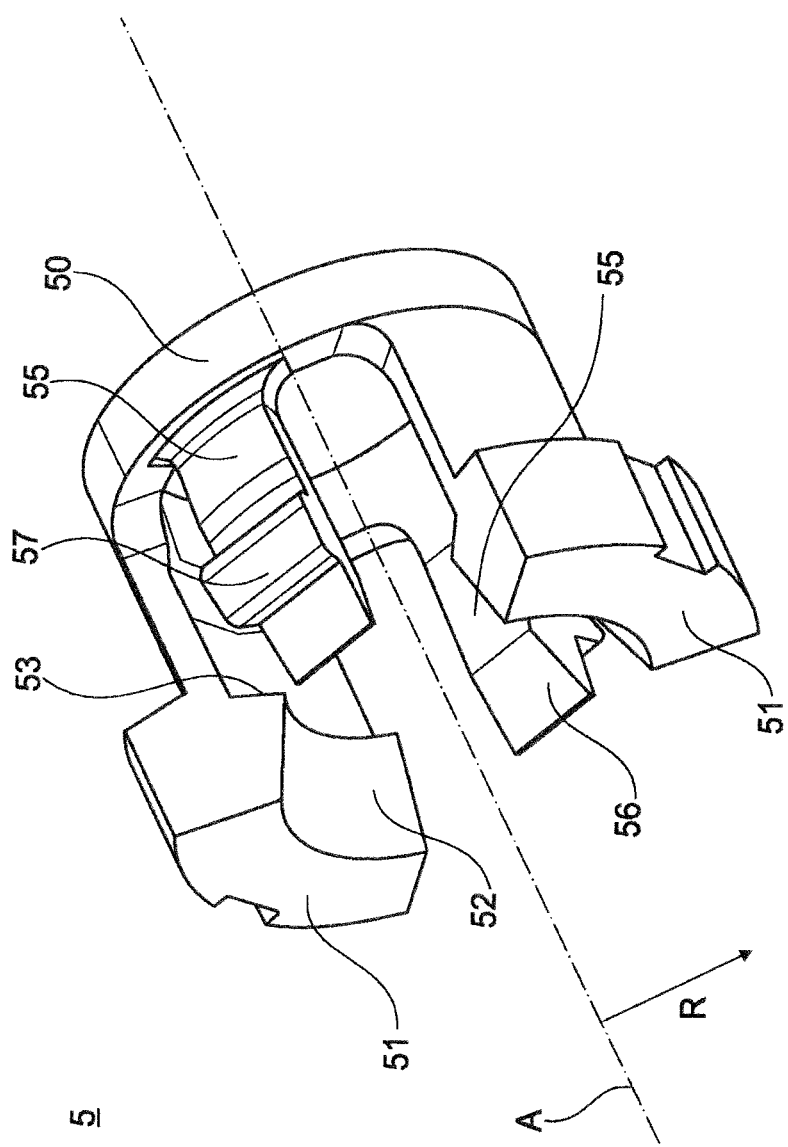
FIG. 4 shows a perspective schematic illustration of the inner locking element of the quick connection arrangement according to the first embodiment.
Figure 5:
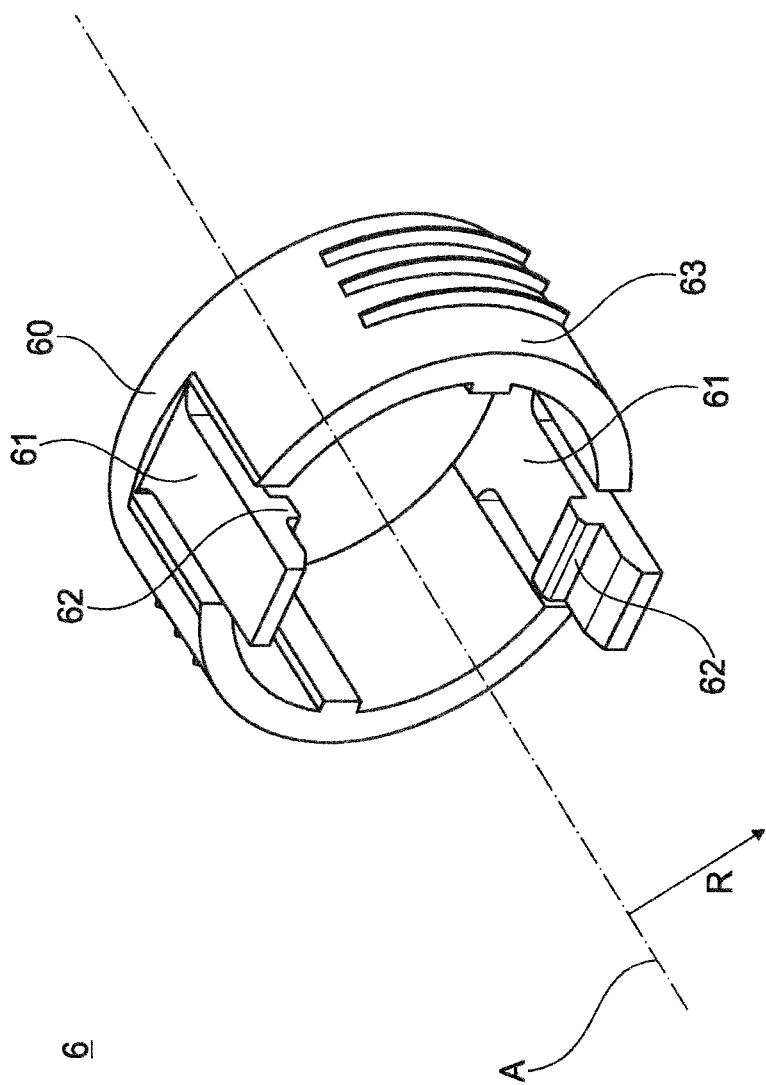
FIG. 5 shows a perspective schematic illustration of the outer locking element of the quick connection arrangement according to the first embodiment.

The quick connection arrangement 3 has a housing 4, an inner locking element 5 and an outer locking element 6, which are illustrated individually in FIGS. 3 to 5 in each case in a perspective schematic illustration of the first embodiment. The designations "inner" and "outer" locking element (5, 6) relate here to the arrangement of the elements with respect to each other and with respect to the housing 4 in the radial direction R.

The housing 4 (also see FIG. 3) substantially constitutes a cylindrical body through which a medium can flow in the direction of the longitudinal axis A of the body. The medium is preferably a fluid. At its one end in the direction of the longitudinal axis A, the housing 4 has an opening 48 for receiving a fluid line 2. The fluid line can be inserted into the opening 48 of the housing 4 as far as a corresponding stop 49 in the interior thereof. The inserted fluid line 2 can be fastened in the opening 48, for example, in a frictional and/or in a form fitting manner by a connecting piece having a pine tree profile. As an alternative or in addition, the fastening can be carried out by an integrally bonded connection, such as, for example, by welding, for example by means of friction or laser welding.

On the end opposite the opening 48 of the fluid line 2 in the direction of the longitudinal axis A, the housing 4 has a connecting piece opening 41 for receiving a connecting piece 1 (SAE connecting piece 1). The connecting piece 1 can be inserted into the connecting piece opening 41 as far as a corresponding stop 47 in the interior of the housing 4.

In this embodiment, that end of the connecting piece 1 with which the connecting piece 1 is inserted into the housing 4 has a sealing arrangement which, from the outside inward, has a first sealing ring 71, a spacer ring 73, a second sealing ring 72 and a guide bushing 74. The two sealing rings (71, 72) here are designed as O rings. Alternatively, use can also be made of a simple sealing arrangement 71 to 74 which consists, for example, of just one sealing ring 71 (O ring).

The connecting piece 1 furthermore has a collar 11 which, in this embodiment, is designed as a closed ring on the outer surface of the connecting piece 1. As an alternative, however, use could be made of projections, which are formed in sections, on the outer surface of the connecting piece 1 in order to achieve an effect according to the invention between the connecting piece 1 and the quick connection arrangement 3. The collar 11 serves for locking the connecting piece 1 in the housing 4 of the quick connection arrangement 3; the locking is brought about by means of an inner locking element 5 which is provided in the interior of the housing 4.

The inner locking element 5 (also see FIG. 4) has an annularly closed locking element body 50, from which, firstly, two mutually radially opposite locking jaws 51 extend and, secondly, offset approximately 90° with respect thereto, two mutually radially opposite ejector arms 55 extend in the direction of the longitudinal axis A. The two locking jaws 51 have an introduction slope 52 and an engage-behind slope 53 on their radially inner side. The inclination of the introduction slope 52 here is formed more shallowly than the inclination of the engage-behind slope 53. The two ejector arms 55 likewise have an introduction slope 56 at their ends. Furthermore, the two ejector arms 55 each have at least one cam 57 which is provided on the ejector arms 55 in the region of the introduction slope 56 in a manner pointing radially outward.

The locking jaws 51 and ejector arms 55 are separated from one another in the circumferential direction by cutouts or recesses in such a manner that they are of a longer size in the direction of the longitudinal axis A than in the circumferential direction in such a manner that the locking jaws 51 and ejector arms 55 are in each case of elastic design in the radial direction R, that is, in particular at their loose ends, can bend away from the longitudinal axis A and, by means of the restoring force of their material, spring back again into their starting position.

The inner locking element 5 is arranged in the interior of the housing 4 in such a manner that the annular locking element body 50 can bear against a corresponding stop 46 of the housing 4 in the direction of the longitudinal axis A. The locking jaws 51 and ejector arms 55 of the inner locking element 5 thereby point in the direction of the longitudinal axis A toward the connecting piece opening 41. The cams 57 of the ejector arms 55 project here outward in the radial direction R into corresponding cutouts 44 of the housing 4 or lie opposite the cutouts in a manner pointing radially outward.

In this embodiment, the outer locking element 6 (also see FIG. 5) of the quick connection arrangement 3 likewise has a closed annular locking ring body 60, but which can alternatively also be of U shape design, that is, with an opening in the circumferential direction. Extending from the annular locking ring body 60 in the direction of the longitudinal axis A are, firstly, two mutually radially opposite latching arms 61 and, secondly, offset approximately 90° with respect thereto, two mutually radially opposite coverings 63. The latching arms 61 each have a cam 62 pointing radially inward.

In the same manner as the locking jaws 51 and ejector arms 55 of the inner locking element 5, the latching arms 61 of the outer locking element 6 are separated from the coverings 63 by cutouts in such a manner that the latching arms 61 are of a longer size in the direction of the longitudinal axis A than in the circumferential direction in such a manner that the latching arms 61 are of elastic design in the radial direction R. By contrast, the coverings 63, because of the large extension thereof in the circumferential direction, are designed to be significantly less elastic in the radial direction R than the latching arms 61, and therefore the coverings 63 can comparatively readily withstand forces acting radially and can therefore be considered to be rigid.

The outer locking element 6 is provided in that region around the housing 4 in which the inner locking element 5 is located in the interior of the housing 4. The annular locking ring body 60 can bear here against a corresponding stop 45 of the housing 4 in the direction of the longitudinal axis A. The latching arms 61 and coverings 63 of the outer locking element 6 thereby point in the direction of the longitudinal axis A toward the connecting piece opening 41. The outer locking element 6 is connected here via its latching arms 61 to the housing 4 in a form fitting manner.

The housing 4 (also see FIG. 3) furthermore has, firstly, two mutually radially opposite cutouts 44, in which the cams 57 of the ejector arms 55 can engage from the inside and the cams 62 of the latching arms 61 in the unlocked state can engage from the outside radially, and, secondly, offset approximately 90° with respect thereto, two mutually radially opposite cutouts 43 for the locking jaws 51 of the inner locking element 5. Both in the unlocked and in the locked state of the collar 11, the locking jaws 51 project into the cutouts 43 in the radial direction R without projecting out of the cutouts 43 in the radial direction R. The inner locking element 5 is thereby frictionally connected via the locking jaws 51 to the housing 4 via the cutouts 43 thereof.

The housing 4 furthermore has two mutually radially opposite opening cutouts 42 which, in this embodiment, are configured to be open in the direction of the longitudinal axis A toward the connecting piece opening 41; alternatively, use can also be made of opening cutouts 42 which are not of open design in the direction of the longitudinal axis A toward the connecting piece opening 41. The cams 62 of the latching arms 61 can engage from the outside radially in the opening cutout 42 in the locked state of the inner locking element 5.

The manner of operation of the quick connection arrangement 3 according to the invention according to the first embodiment is now described below with respect to FIGS. 1, 2 and 6 to 8 using the example of introducing and blocking the connecting piece 1 in the quick connection arrangement 3, which can be summarized briefly as follows:
  the connecting piece 1 is introduced in the direction of the longitudinal axis A into the connecting piece opening 41 of the housing 4 (cf. FIGS. 1 and 2);
  by further introduction of the connecting piece 1 as far as the stop 47, the collar 11 raises the locking jaws 51 via the introduction slopes 52 of same until the collar 11 is locked by the engage behind slopes 53 of the locking jaws 51;
  at the same time, the collar 11 raises the ejector arms 55 by means of the introduction slopes 56 of same, and therefore the cams 57 of the ejector arms 55 push the cams 62 of the latching arms 61 radially out of the corresponding cutout 44, as a result of which the outer locking element 6 is displaceable in the direction of the longitudinal axis A (cf. FIG. 6);
  by displacement of the outer locking element 6 in the direction of the longitudinal axis A away from the stop 45, the coverings 63 are pushed over the cutout 43 of the locking jaws 51 such that the locking jaws 51 are blocked to the outside in the radial direction R. By this means, the locking jaws 51 are locked, and therefore the locking of the collar 11 by the locking jaws 51 can no longer be undone without the outer locking element 6 being displaced beforehand. The outer locking element 6 is automatically locked in this position by the cams 62 of the latching arms 61 by the cams 62 engaging in the opening cutouts 42 of the housing 4 (cf. FIGS. 7 and 8).

In FIGS. 1 and 2, the connecting piece 1 is already partially, but not completely, introduced into the corresponding connecting piece opening 41 of the housing 4. The elements of the sealing arrangement 71 to 74 are pushed here in the direction of the longitudinal axis A against the corresponding stop 47 of the housing 4 and in the radial direction R against the inner wall of the housing 4 in this region in order thereby to seal the housing 4.

In the installation state shown in FIGS. 1 and 2, the collar 11 of the connecting piece 1 does not touch the introduction slopes 52 of the locking jaws 51 and the introduction slopes 56 of the ejector arms 55. The latter, like the latching arms 61 of the outer locking element 6, are in each case in a substantially relaxed state, that is, the locking jaws 51, ejector arms 55 and latching arms 61 substantially extend in the direction of the longitudinal axis A and are not subject to any substantial radially acting forces, that is, are not deflected radially at all or at least not substantially in relation to the longitudinal axis A. In this embodiment, the inner sides of the locking jaws 51 and ejector arms 55 rest linearly in the circumferential direction on the outer surface of the connecting piece 1; alternatively, the locking jaws 51 and/or ejector arms 55 are also unable to touch the outer surface of the connecting piece 1 because of a radial spacing.

The locking jaws 51 project in the radial direction R into their corresponding cutouts 43 of the housing 4 without projecting out of the cutouts in the radial direction R. The cams 57 of the ejector arms 55 lie in the radial direction R opposite the cams 62 of the latching arms 61 in the region of the corresponding cutout 44 of the housing 4, wherein the cams (57, 62) in this embodiment touch, but this is not required for the function according to the invention of the quick connection arrangement 3.

In this embodiment, the outer locking element 6 bears with its annular locking ring body 60 against the corresponding stop 45 of the housing 4, but this is not required. However, in this installation state, the outer locking element 6 has to be positioned in the direction of the longitudinal axis A in relation to the housing in such a manner that the cutouts 43 of the housing 4, into which cutouts the locking jaws 51 of the inner locking element 5 project, are not covered or are covered by the coverings 63 of the outer locking element 6 only to the extent that the locking jaws 51 can be pushed radially outward out of the cutouts 43.

Figure 6:
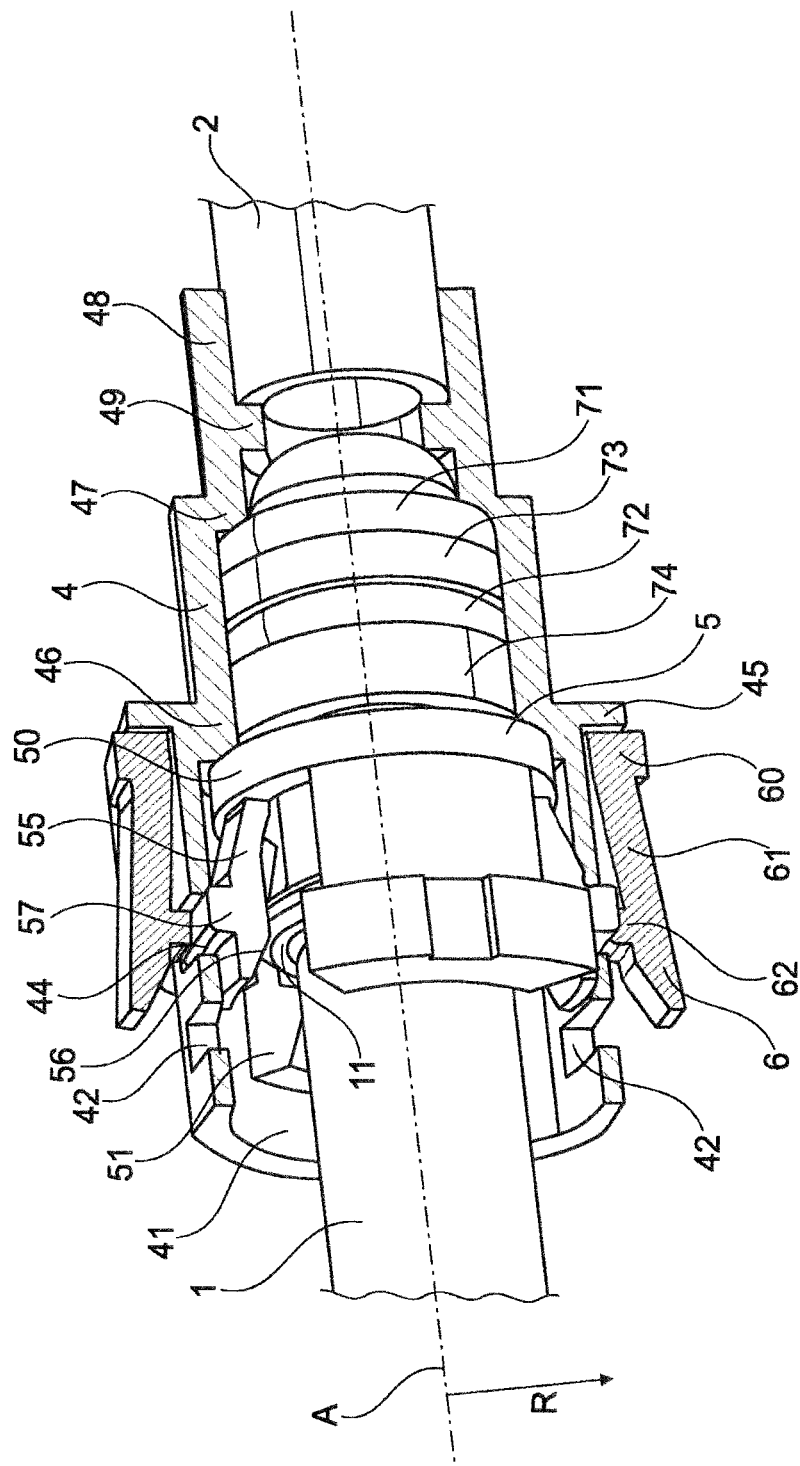
FIG. 6 shows a perspective schematic sectional illustration of a quick connection arrangement according to the first embodiment with a fluid line and with the connecting piece completely introduced and locked.

FIG. 6 shows a perspective schematic sectional illustration of a quick connection arrangement 3 according to the invention with a fluid line 2 and connecting piece 1 which is completely introduced and locked. The connecting piece 1 here is introduced into the corresponding connecting piece opening 41 of the housing 4 to such an extent that the sealing arrangement 71 to 74 is pressed in a sealing manner against the corresponding stop 47 of the housing 4 or the inner wall thereof. The end of the connecting piece 1 can be pushed here through the sealing arrangement 71 to 74 in the direction of the longitudinal axis A against the stop 49 of the housing 4, against which stop the fluid line 2 bears from the opposite side in the direction of the longitudinal axis A.

Upon this complete introduction, the locking jaws 51 and ejector arms 55 of the inner locking element 5 are deflected resiliently in the radial direction R by the collar 11 of the connecting piece 1 by the collar 11 raising the locking jaws and ejector arms by contact with the introduction slopes 52 of the locking jaws 51 and introduction slopes 56 of the ejector arms 55. The inclinations of the introduction slopes 52 of the locking jaws 51 and introduction slopes 56 of the ejector arms 55 can be selected here in such a manner that simple introduction of the connecting piece 1 is possible counter to the elastic restoring forces of the introduction slopes 52 of the locking jaws 51 and introduction slopes 56 of the ejector arms 55.

In the completely introduced state, the collar 11 of the connecting piece 1 has completely passed the introduction slopes 52 of the locking jaws 51 in the direction of the longitudinal axis A such that the locking jaws 51 spring back again radially behind the collar 11 in the introduction direction and thereby grip behind the collar 11. The collar is thereby blocked and locked by the engage behind slopes 53 of the locking jaws 51 in the direction of the longitudinal axis A.

In this state, the cams 57 of the ejector arms 55 are at the same time pushed into the corresponding cutouts 44 of the housing 4 to such an extent that the cams 57 of the ejector arms 55 push the cams 62 of the latching arms 61 out of the cutouts 44 to such an extent that the cams 62 of the latching arms 61 no longer block a displacement of the outer locking element 6 in the direction of the longitudinal axis A.

Figure 7:
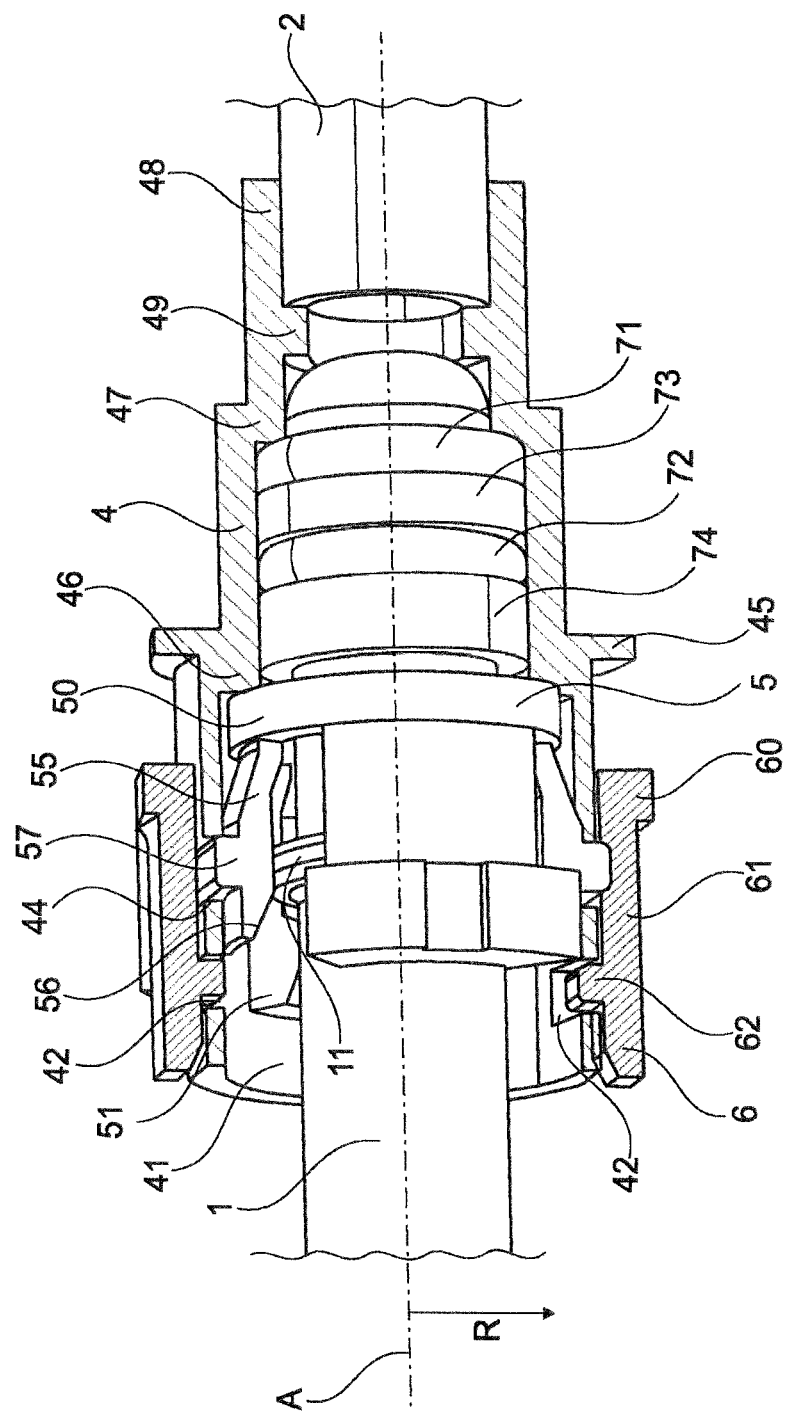
FIG. 7 shows a perspective schematic sectional illustration of a quick connection arrangement according to the first embodiment with a fluid line, a locked connecting piece and a locked inner locking element.
Figure 8:
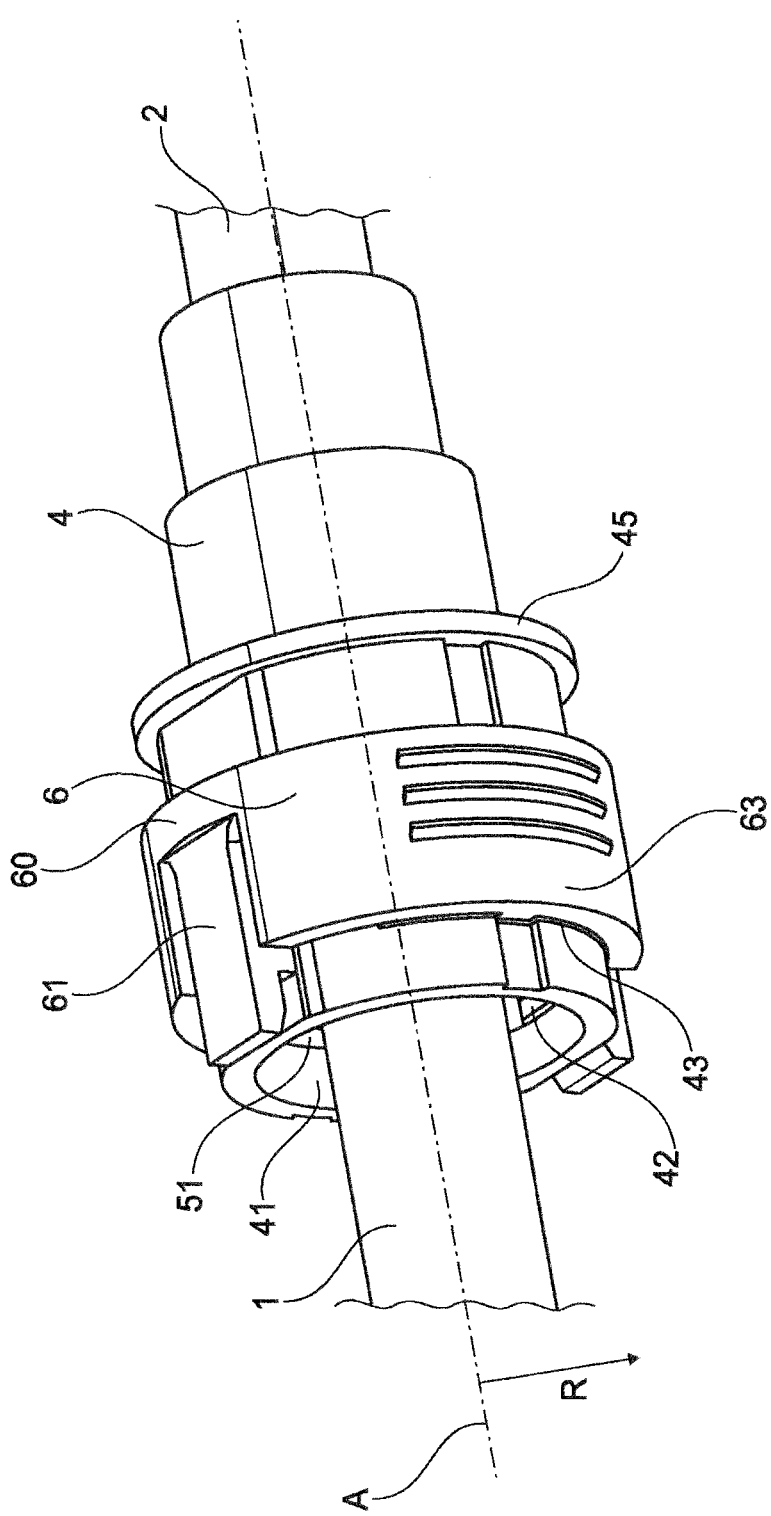
FIG. 8 shows a perspective schematic closed illustration of the quick connection arrangement according to the first embodiment of FIG. 7.

FIG. 7 shows a perspective schematic sectional illustration of a quick connection arrangement 3 according to the invention with a fluid line 2, a locked connecting piece 1 and a locked inner locking element 5. FIG. 8 shows a perspective schematic closed illustration of the quick connection arrangement of FIG. 7.

In this installation state, the outer locking element 6 has been displaced away from the corresponding stop 45 of the housing 4 in the direction of the longitudinal axis A to an extent such that the cams 62 of the latching arms 61 engage in the opening cutouts 42 of the housing 4 and thereby block and lock a displacement of the outer locking element 6 in the direction of the longitudinal axis A. At the same time, the cutouts 43 of the housing 4, through which cutouts the locking jaws 51 of the inner locking body 5 can be pushed out radially, are thereby blocked and locked by the coverings 63 of the outer locking body 6.

The connecting piece 1 is thereby securely held in the quick connection arrangement 3 by the engage behind slopes 53 of the locking jaws 51 gripping behind the collar 11 in the direction of the longitudinal axis A. The release of the lock is prevented according to the invention by the cutouts 43 of the housing 4, through which the locking jaws 51 can be pushed out radially by the collar 11, being blocked by the coverings 63 of the outer locking element 6. The release of the blockade, in turn, is prevented by the cams 62 of the latching arms 61 engaging radially in the corresponding cutouts 42 of the housing 4 and thus preventing an inadvertent displacement of the outer locking element 6 in the direction of the longitudinal axis A, which displacement would otherwise release the cutouts 43 of the housing 4, through which cutouts the locking jaws 51 can be pushed out radially by the collar 11.

In a corresponding manner, the connection between connecting piece 1 and quick connection arrangement 3 can be released by the latching arms 61 of the outer locking element 6 being raised radially to an extent such that the cams 62 of the latching arms 61 project out of the corresponding cutouts 42 of the housing 4 and then the outer locking element 6 is displaced in the direction of the longitudinal axis A toward the corresponding stop 45 of the housing 4 to such an extent that the coverings 63 of the outer locking element 6 again release the cutouts 43 of the housing 4, through which cutouts the locking jaws 51 can be pushed out radially by the collar 11.

The connecting piece 1 and the quick connection arrangement 3 can then be moved away from each other relative to each other such that the collar 11 of the connecting piece 1 raises the locking jaws 51 radially by means of the engage behind slopes 53 and pushes the locking jaws through the cutouts 43 of the housing 4. As soon as the collar 11 has passed out of the housing 4 past the introduction slopes 52 of the locking jaws 51 in the direction of the longitudinal axis A, the locking jaws 51 spring back again radially inward, connecting piece 1 and quick connection arrangement 3 are separated and the quick connection arrangement 3 has reached the installation starting state.

Figure 9:
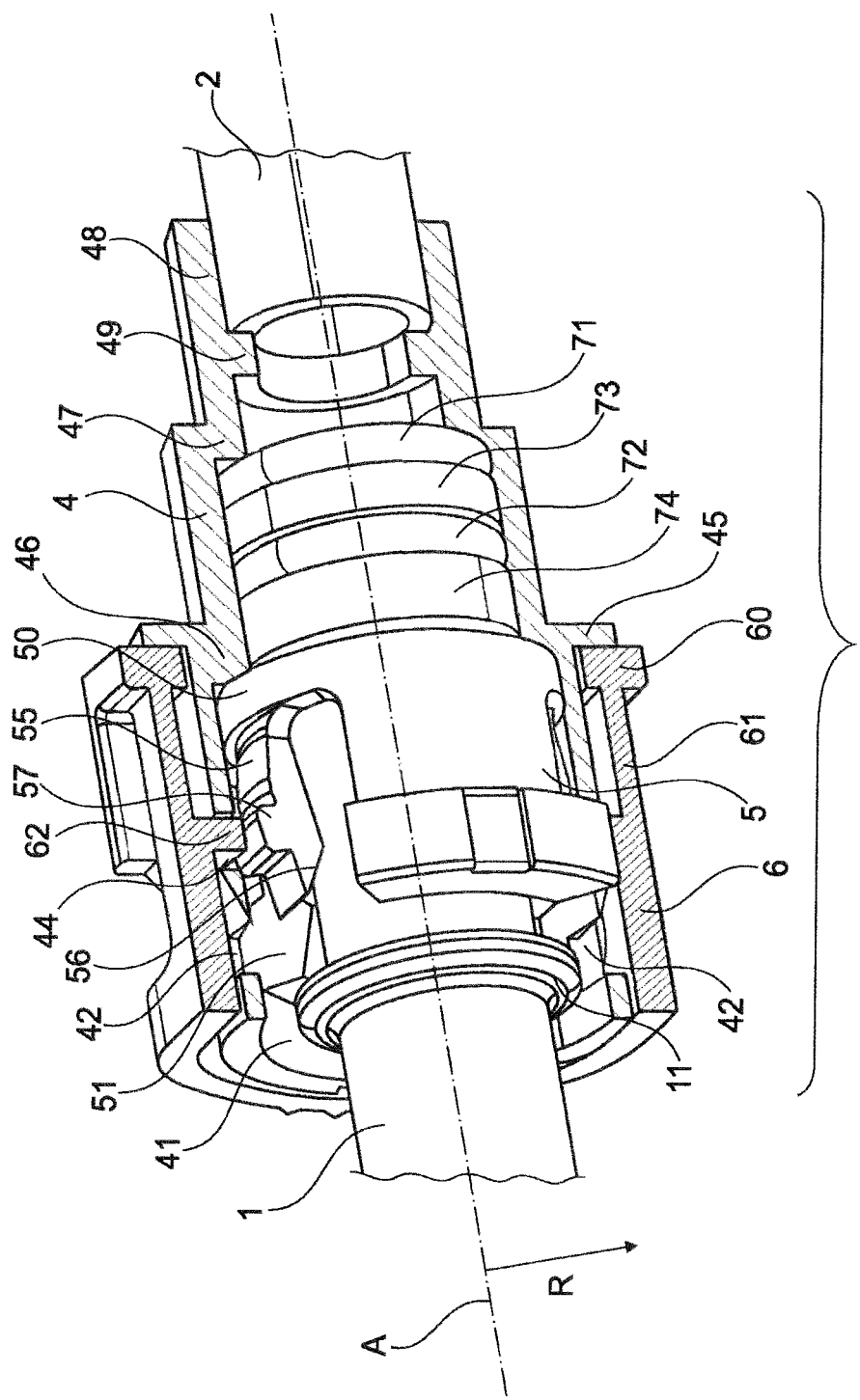
FIG. 9 shows a perspective schematic sectional illustration of a quick connection arrangement according to a second embodiment with a fluid line and with a connecting piece which is partially introduced but is not locked.
Figure 10:
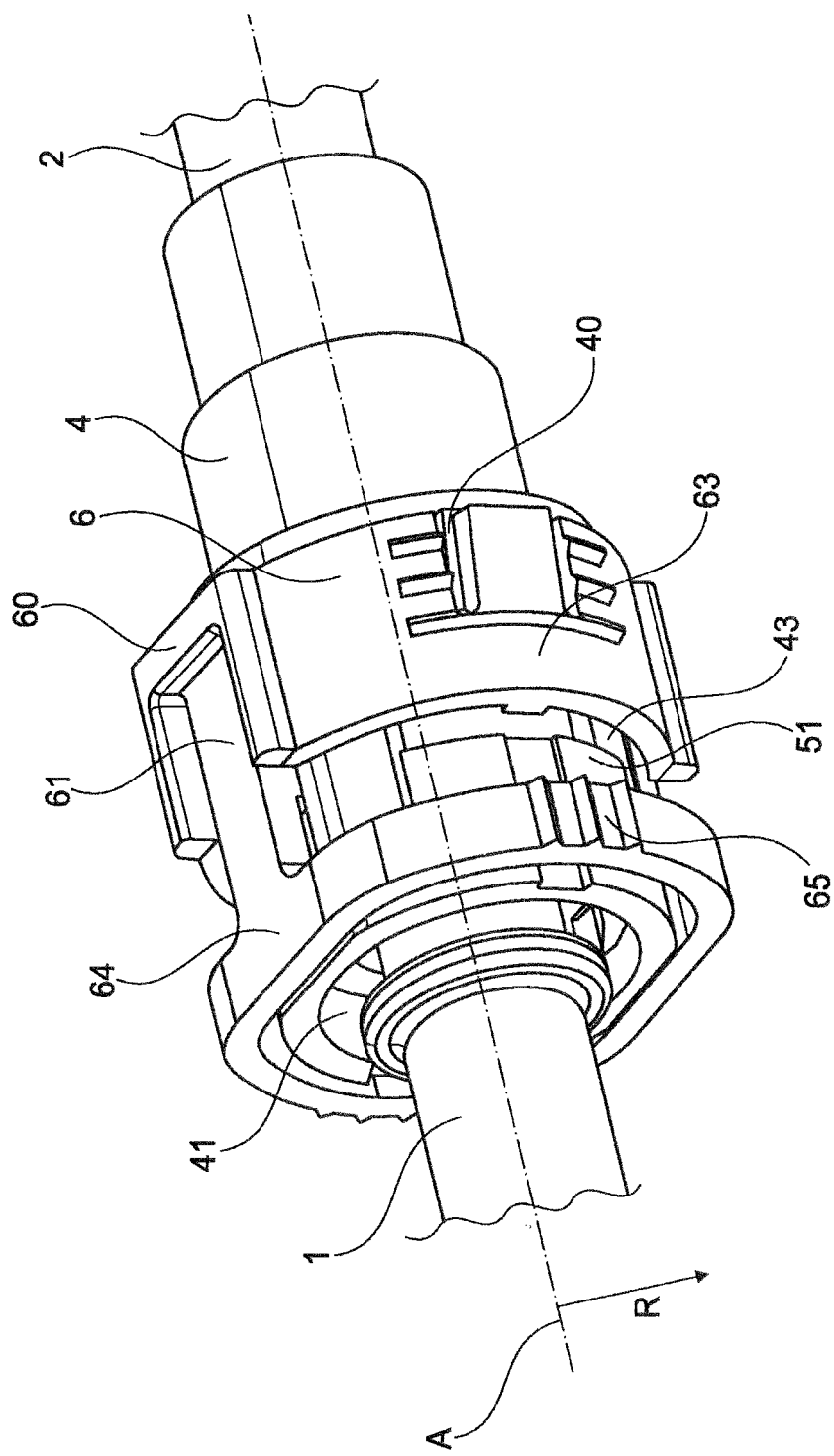
FIG. 10 shows a perspective schematic closed illustration of the quick connection arrangement according to the second embodiment of FIG. 9.
Figure 11:
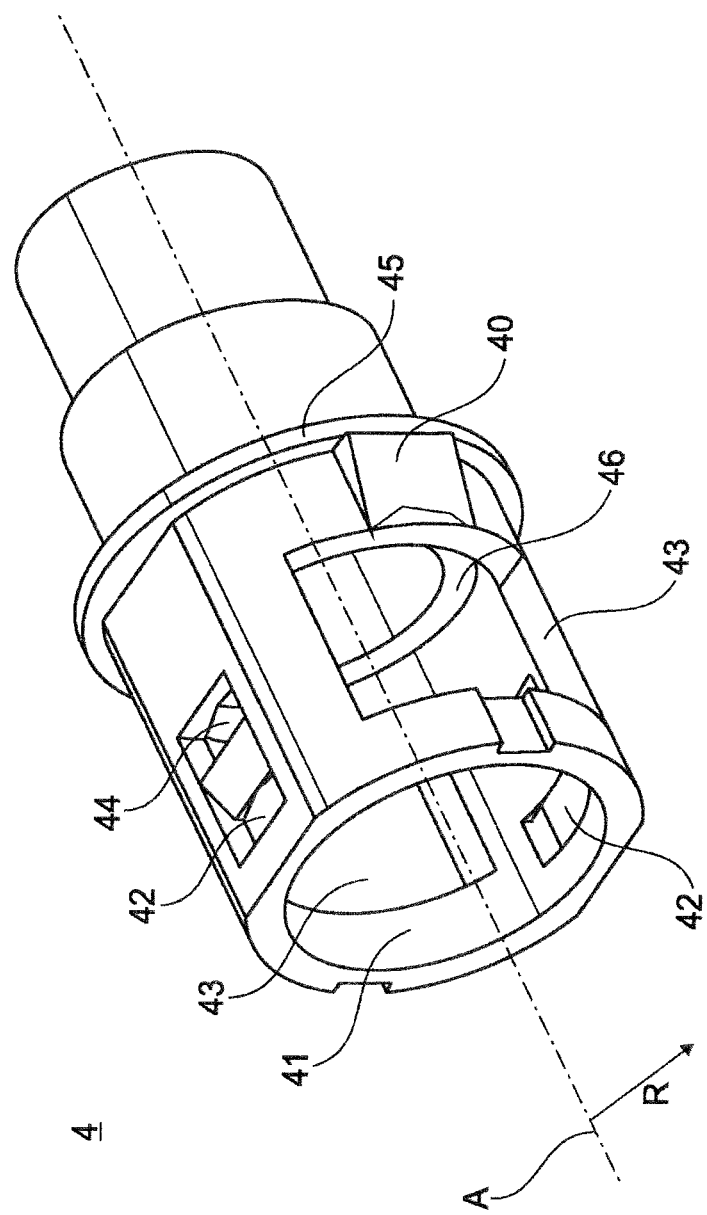
FIG. 11 shows a perspective schematic illustration of the housing of the quick connection arrangement according to the second embodiment.
Figure 12:
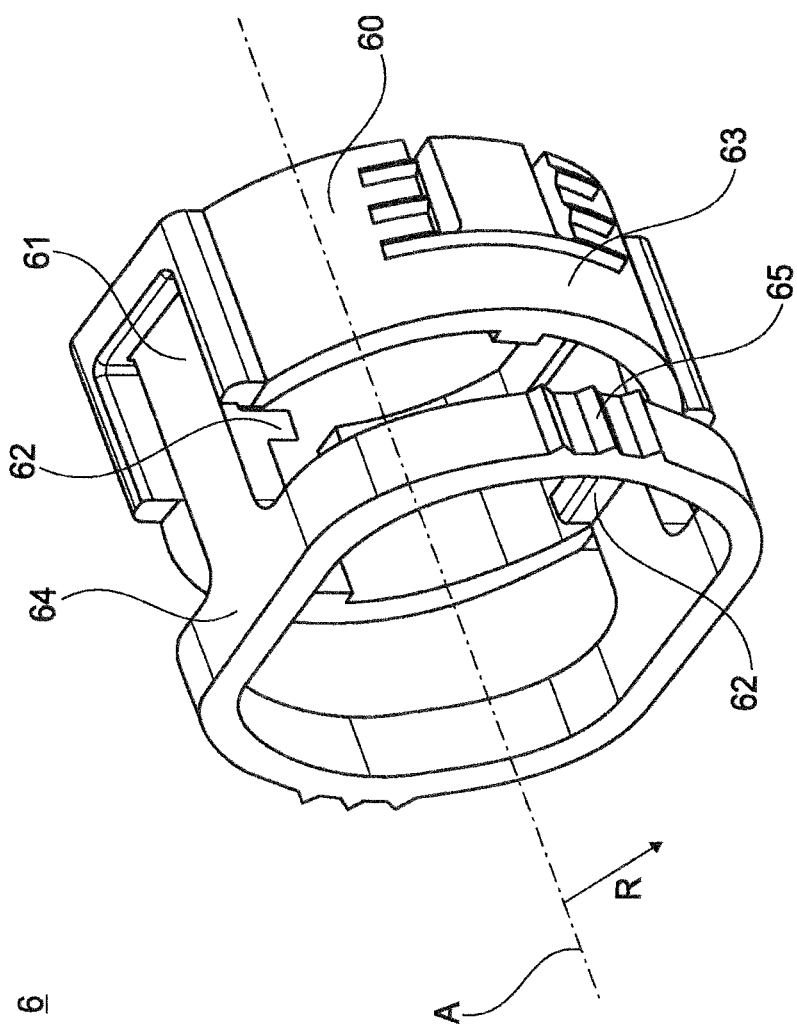
FIG. 12 shows a perspective schematic illustration of the outer locking element of the quick connection arrangement according to the second embodiment.

FIG. 9 shows a perspective schematic sectional illustration of a quick connection arrangement 3 according to the invention according to a second embodiment with a fluid line 2 and partially introduced but not locked connecting piece 1. FIG. 10 shows a perspective schematic closed illustration of the quick connection arrangement 3 of FIG. 9. The housing 4 and the outer locking element 6 according to the second embodiment are illustrated individually in FIGS. 11 and 12, in each case in a perspective schematic illustration. The inner locking element 5 is identical in both embodiments, cf. FIG. 4.

The quick connection arrangement 3 according to the second embodiment differs from that of the first embodiment firstly by the fact that the housing 4 now has two projections 40 which point radially outward and are arranged lying radially opposite each other. The projections 40 are of wedge shaped design in such a manner that they each have a slope which is oriented in the axial direction A toward the connecting piece opening 41.

If the connecting piece 1 is not yet or is not completely introduced into the connecting piece opening 41 of the housing 4, the outer locking element 6 is in an installation state in which it bears by means of its annular locking body 60 against the corresponding stop 45 of the housing 4 and is latched by the cams 62 of its latching arms 61 in the corresponding opening cutout 42 of the housing 4, see FIG. 9. In the installation state, the wedge shaped projections 40 now push against the annular locking body 60 from the inside in such a manner that the locking body experiences a prestress in the axial direction A. The prestress can be assisted by the fact that the annular locking body 60 is formed in this region by axial slots in such a manner that a partial region of the annular locking body 60 pushes resiliently against the projections 40 of the housing 4.

Figure 13:
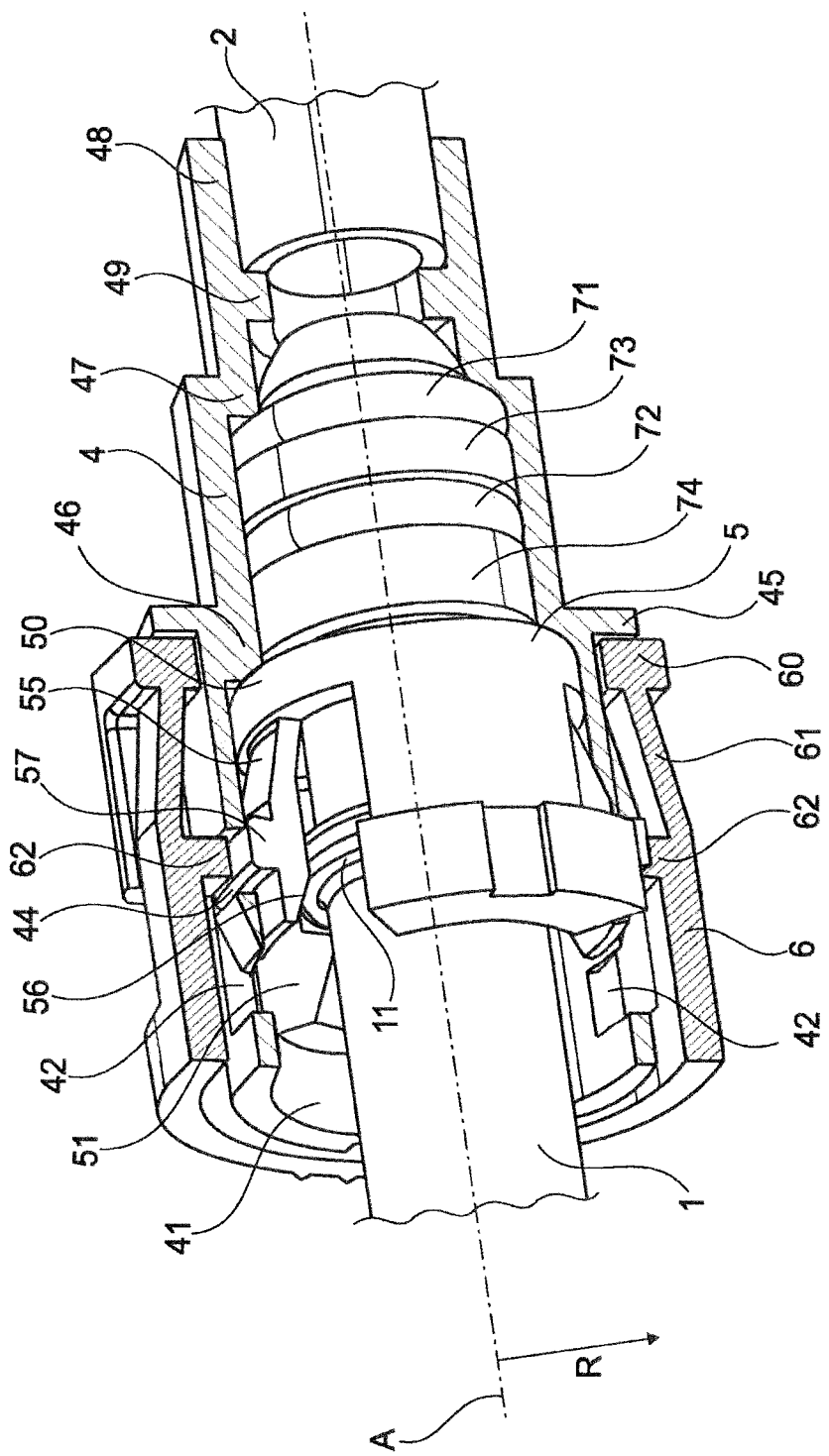
FIG. 13 shows a perspective schematic sectional illustration of a quick connection arrangement according to the second embodiment with a fluid line and a connecting piece which is completely introduced and locked.

If the connecting piece 1 is then introduced completely into the housing 4, then, in the case of the quick connection arrangement 3 according to the second embodiment too, the cams 57 of the ejector arms 55 of the inner locking element 5 push the cams 62 of the latching arms 61 of the outer locking element 6 out of the corresponding cutouts 44 of the housing 4, cf. FIG. 13. The prestress of the wedge shaped projections 40 can now move the outer locking element 6 in the axial direction A to an extent such that the outer locking element 6 again latches via the cams 62 of its latching arms 61 in the opening cutouts 42 of the housing 4 and via its locking coverings 63 radially blocks the cutouts 43 of the locking jaws 51 of the inner locking element 5.

Via the quick connection arrangement 3 according to the second embodiment, the quick connection is secured in the same secure manner and so as to be discernible visually and by feel as in the case of the quick connection arrangement 3 according to the first embodiment, but, because of the prestress, the axial displacement of the outer locking element 6 takes place automatically via the quick connection arrangement 3 itself, as a result of which the installation is simplified and accelerated.

The quick connection arrangement 3 according to the second embodiment differs from that of the first embodiment secondly by the fact that the outer locking element 6 has an opening ring 64. The opening ring 64 is formed on that side of the outer locking element 6 which faces the connecting piece and has a substantially oval cross section, that is, the diameter of the opening ring 64 is greater in a radial direction R than in the radial direction R which is substantially perpendicular thereto. The regions of the larger cross section are referred to here as push-in regions 65. The regions of the smaller cross section are formed adjacent to the latching arms 61 substantially in the axial direction A, cf. FIG. 12. In this second embodiment, the geometry of the housing 4 in the region of the connecting piece opening 41 is formed in a manner corresponding to the geometry of the opening ring 64, cf. FIG. 11.

If a connecting piece 1 is introduced completely into the quick connection arrangement 3 according to the second embodiment, the cams 57 of the ejector arms 55 of the inner locking arms 5 are pushed out of the corresponding cutouts 44 of the housing 4 by the cams 62 of the latching arms 61 of the outer locking element 6, cf. FIG. 13. In the process, the opening ring 64 is deformed to the effect that the small diameter in the region of the latching arms 61 is increased and, correspondingly, the push-in regions 65 are contracted radially inward.

Figure 14:
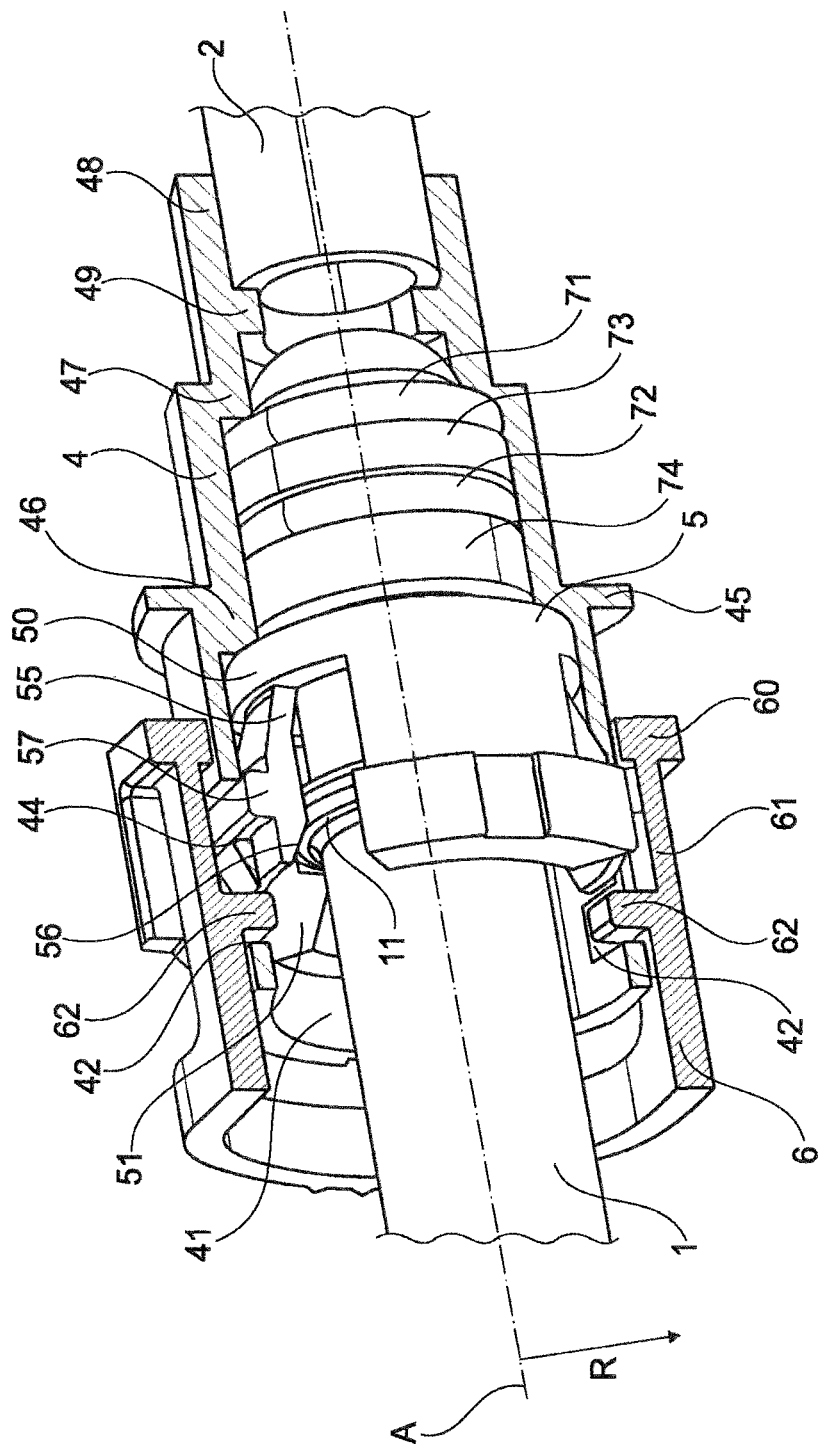
FIG. 14 shows a perspective schematic sectional illustration of a quick connection arrangement according to the second embodiment with a fluid line, a locked connecting piece and a locked inner locking element; and, FIG. 15 shows a perspective schematic closed illustration of the quick connection arrangement according to the second embodiment of FIG. 14.
Figure 15:
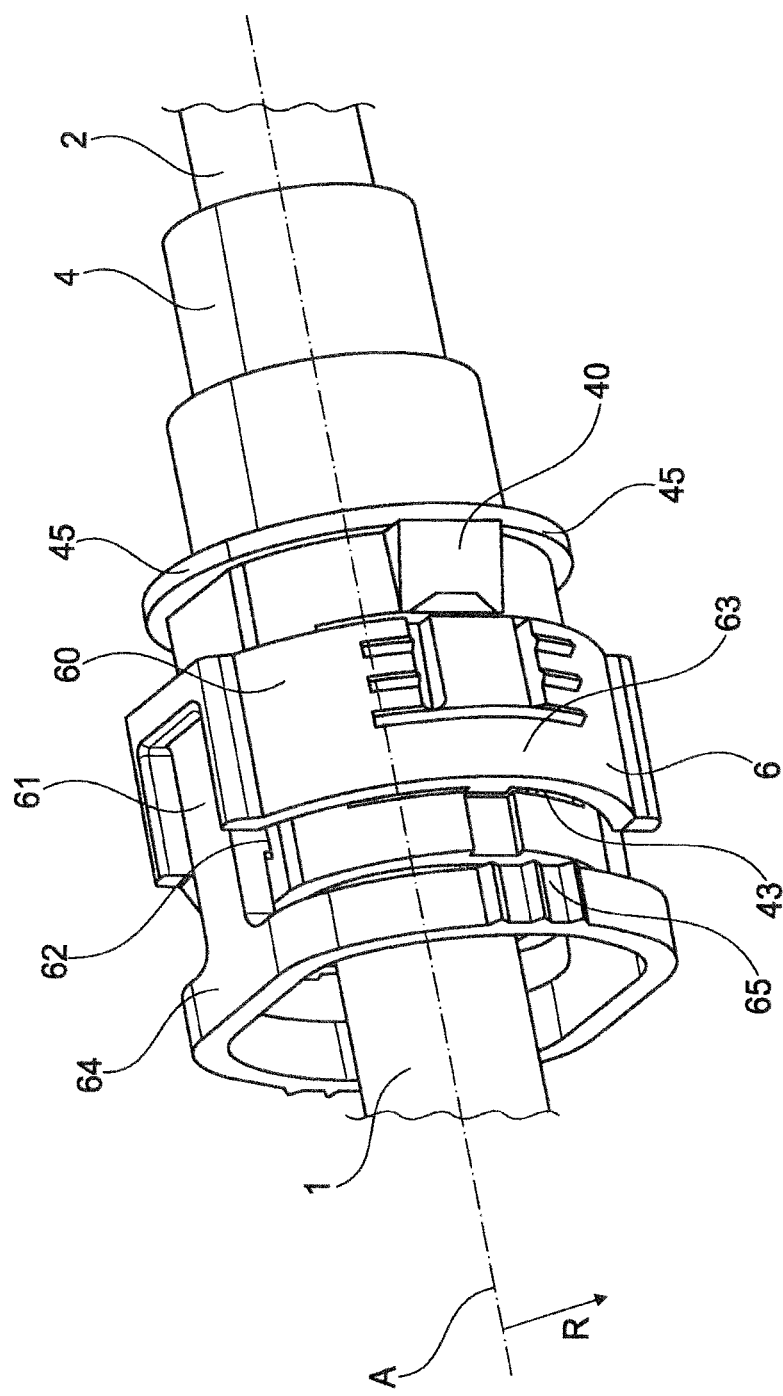

If the outer locking element 6 has been moved axially and the cams 62 of its latching arms 61 are latched again in the opening cutouts 42 of the housing 4, the opening ring 64 relaxes back again into its oval initial shape. The locking of the inner locking element 5 by the outer locking element 6 has therefore endured, cf. FIGS. 14 and 15.

If the locking is intended to be undone, this can take place very simply in the case of the quick connection arrangement 3 according to the second embodiment by the push-in regions 65 of the opening ring 64 being pushed together radially inward, for example manually. By the diameter of the opening ring 64 being pushed together in the region of the push-in regions 65, the opening ring 64 is expanded radially in the region of the latching arms 61, and therefore the cams 62 of the latching arms 61 of the outer locking element 6 move radially out of the opening cutouts 42 of the housing 4. In this state of the pushed together push-in regions 65, the outer locking element 6 can thereby be moved in the axial direction A toward the corresponding stops 45 of the housing 4 such that the locking coverings 63 of the outer locking element 6 release the corresponding cutouts 43 of the housing 4, and the connecting piece 1 can be pulled out of the housing 4 axially.

By means of the quick connection arrangement 3 according to the second embodiment, the quick connection is secured in the same secure manner and so as to be discernible visually and by feel as in the case of the quick connection arrangement 3 according to the first embodiment, but the quick connection can be undone more simply and rapidly, as a result of which the removal is simplified and accelerated.

It is understood that the foregoing description is that of the preferred embodiments of the invention and that various changes and modifications may be made thereto without departing from the spirit and scope of the invention as defined in the appended claims.

LIST OF DESIGNATIONS

Part of the Description

A Longitudinal axis
R Radius, radial direction perpendicular to the longitudinal axis A
1 (SAE) connecting piece
11 Radial projection, preferably collar of the connecting piece 1
2 Medium line, preferably fluid line
3 Quick connection arrangement
4 Housing of the quick connection arrangement 3
40 Projection
41 Connecting piece opening
42 Opening cutout for cams 62 of the latching arms 61
43 Cutout for locking jaws 51, locking arm recess
44 Cutout for cams 57 of the ejector arms 55 and cams 62 of the latching arms 61
45 Stop for outer locking element 6
46 Stop for inner locking element 5
47 Stop for first sealing ring 71
48 Opening for fluid line 2
49 Stop for fluid line 2
5 Inner locking element
50 Annular locking element body
51 Locking jaws, locking arm
52 Introduction slope of the locking jaws 51
53 Engage-behind slope of the locking jaws 51
55 Ejector arms, release mechanism
56 Introduction slope of the ejector arms 55
57 Cams of the ejector arms 55
6 Outer locking element
60 Annular locking ring body
61 Latching arms, blockade mechanism
62 Cams of the latching arms 61
63 (Locking arm) covering
64 Opening ring
65 Push-in region of the opening ring 64
71 First sealing ring (O ring)
72 Second sealing ring (O ring)
73 Spacer ring
74 Guide bushing

What is claimed is:

1. A quick connection arrangement for detachably connecting a medium line to a connecting piece, the quick connection arrangement comprising:

a housing defining a first opening configured to receive said medium line therein;

said housing defining a second opening for receiving said connecting piece so as to permit a medium to flow through said housing between said medium line and said connecting piece;

said connecting piece and said medium line conjointly defining a longitudinal axis (A);

an inner locking element arranged in said second opening and configured to lock the connecting piece in said second opening;

an outer locking element arranged on said housing outside said second opening and configured to lock said inner locking element when locking said connecting piece;

said housing having a through cutout formed therein;

said outer locking element defining an immovable state wherein said outer locking element is held in said cutout so as to be immovable in a direction along said longitudinal axis (A) and a movable state wherein said outer locking element is movable along said longitudinal axis (A) between a first position at said through cutout and a second position whereat said outer locking element blocks said inner locking element to prevent a removal of said connecting piece from said housing;

said outer locking element having a blocking mechanism holding said outer locking element in said first position; and, said inner locking element including a release mechanism configured to act on said blocking mechanism of said outer locking element via said through cutout to release said blocking mechanism and to transfer said outer locking element from said immovable state into said movable state when said connecting piece is inserted into said second opening so as to permit displacing said outer locking element along said longitudinal axis (A) from said first position to said second position;

said inner locking element having a locking arm;

said housing having a locking arm cutout formed therein;

said locking arm being configured to be pushable out radially through said locking arm cutout; and, said outer locking element having a locking arm cover configured to unblock said locking arm cutout in said first position and to block said locking arm cutout in said second position.

2. The quick connection arrangement of claim 1, wherein said outer locking element is holdable in position in said first position as well as in said second position.

3. The quick connection arrangement of claim 2, wherein said outer locking element has an opening ring having at least one push-in region configured to enable, when said outer locking element is blocked in said second position, said outer locking element to be released from being blocked via a radially inwardly directed application of force applied to said push-in region.

4. The quick connection arrangement of claim 3, wherein said housing has at least one radially outwardly directed projection configured to be pushable from within radially against said outer locking element so as to enable a force, which is directed toward said second opening essentially in the direction of said longitudinal axis (A), to be applied to said outer locking element.

* * * * *